June 2, 1970 M. KRULL 3,514,891
SLIP-ON FISH LINE ATTACHMENT
Filed June 19, 1969
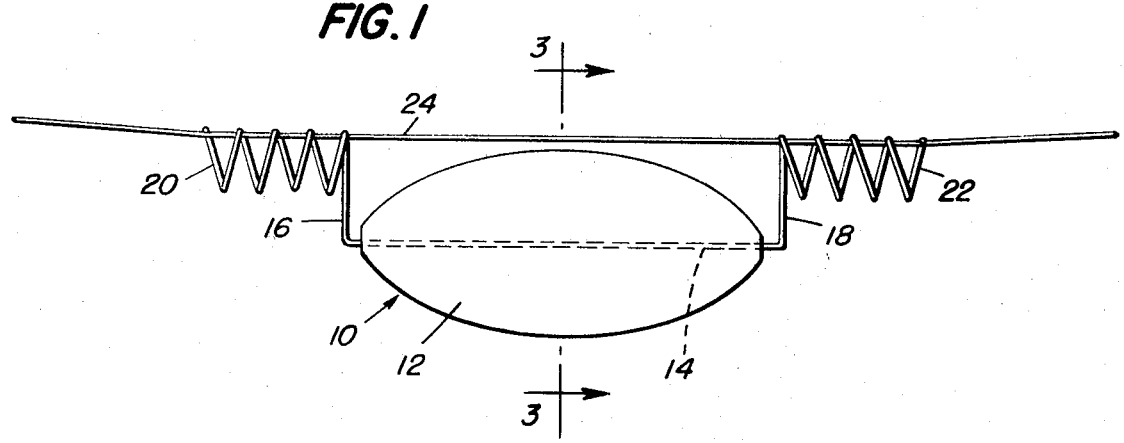
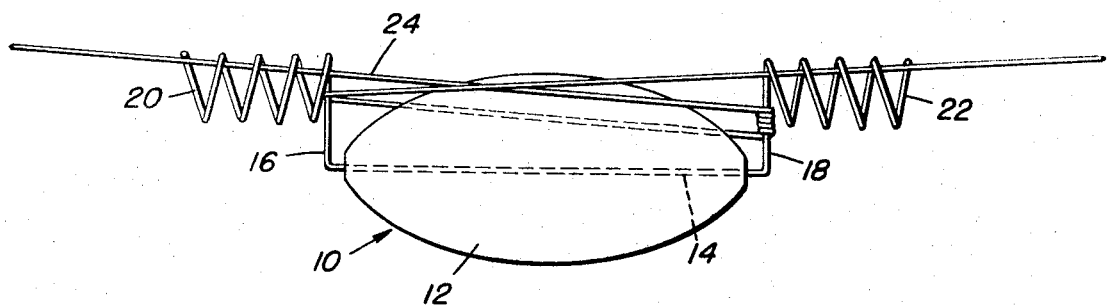
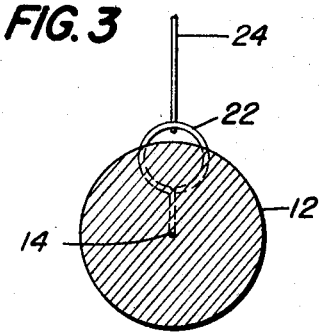
INVENTOR
Maurice Krull
BY *Gustav Miller*
ATTORNEY

United States Patent Office 3,514,891
Patented June 2, 1970

3,514,891
SLIP-ON FISH LINE ATTACHMENT
Maurice Krull, Miami Beach, Fla. (119–30 N. Bayshore Drive, North Miami, Fla. 33161)
Filed June 19, 1969, Ser. No. 834,829
Int. Cl. A01k *93/00, 95/00*
U.S. Cl. 43—44.87
1 Claim

ABSTRACT OF THE DISCLOSURE

The slip-on sinker or float attachment of this invention is capable of being slidably mounted on an uncut fish line or of being anchored on an uncut, unknotted fish line. It consists of a weighty body, such as lead, iron, or other heavy sinkable material, or lightweight floatable material, is preferably elongated, and has a linear member or wire secured at opposite ends of the elongate body, preferably by extending integrally through the body, which then is turned at right angles to the longitudinal axis of the body for a distance greater than the radius of the thickness of the body, and then terminates in a coil at each end whose axis is parallel to the longitudinal axis of the attachment body. The attachment is slidably mounted on the uncut fish line by merely winding the fish line through the offset coils. It is anchored on the uncut fish line by first winding the uncut fish line through one coil, then winding the fish line about both offset portions of the wire, and then through the other of the coils. With a first sinker attachment already in place on the fish line in the water, a second or third sinker can be added thereto, when necessary, by merely slidably mounting a second or third sinker to the fish line and sliding it down on the fish line into abutment with the anchored sinker.

OBJECTS OF THE INVENTION

It is an object of this invention to provide a fish line sinker made of heavyweight sinkable material, or a float of floatable material, that can be attached to or detached from a fish line without the necessity of cutting the line or knotting the line, and can be attached so that it will be slidable on the fish line, or can be anchored at any spot on the line.

A further object of this invention is to provide a means for increasing the sinker weight adjacent the fish line hook by first attaching a sinker attachment to the fish line in anchored position adjacent the hook, then slidably attaching a second one or more slidable sinkers at the fisherman's end and merely sliding the slidably attached sinker along the line into abutting position with the anchored sinker.

Still a further object of this invention is to utilize the same inventive idea in a fish line float or bobber, enabling the float or bobber, made of a lightweight floatable material, to be anchored anywhere to the uncut fish line to thus support the hook or sinker and hook at any desired depth, and further, to enable the float or bobber to be readily removed and repositioned on a dry or wet fish line without cutting, tying or knotting or unknotting or untying the fish line.

Yet a further object of this invention is to provide a fish line attachment which may be slidably mounted on an uncut fish line or anchored on the uncut fish line, without necessitating the knotting or tying or unknotting or untying of the fish line, which can be mounted or removed readily from a wet fish line or from a dry fish line.

Still a further object of this invention is to provide a fish line attachment, readily attachable to or detachable therefrom in either anchored or slidable position, using the same means.

A still further object of this invention is to provide a fish line attachment which may be of floatable material and provide a fish line float, or sinkable material, and provide a fish line sinker, and which is made of a minimum of two parts, one, an attachment body and two, a linear member extending longitudinally through the body and having offset portions terminating in open ended coils, such linear member being a wire either of metal or other suitable material, such as a sutiable plastic.

Still a further object of this invention is to provide a fish line attachment body, which may be either a sinker or a float, depending on the specific gravity of its material, which attachment body is preferably elongated and has a single wire extending through its elongate axis and then extending offset to the body to a distance greater than its radius about its elongate axis, and terminating at each end in an open coil.

BACKGROUND OF THE INVENTION

Fish line attachments, such as floats or sinkers, have been attached to fish lines from time immemorial in various ways, including cutting and tying the attachment to the fish line, knotting the fish line to the attachment, fastening it with the lines or resilient lines, and various other means. Invariably, such means are difficult to operate and have many obvious disadvantages, including the difficulty of repositioning the attachment, especially on a wet fish line.

BRIEF SUMMARY OF THE INVENTION

This invention overcomes all the disadvantages and difficulties of the prior art—it consists of a minimum of only two parts, one an elongate body, of heavy material if for use as a sinker, of lightweight material if for use as a float, with a linear member, such as a wire of suitable material extending through the elongate axis, then offset at each end a length at least equal to or slightly greater than the radius from the longitudinal axis, and then terminating in coils about an axis parallel to the longitudinal axis of the body. Also, although a coil is present at each end, it is not necessarily a resilient coil, and any resiliency that may be present in the coil provides no function in attaching or detaching the attachment on or from the uncut fish line.

BRIEF DESCRIPTION OF THE FIGURES

With the above and related objects in view, this invention consists in the details of construction and combination of parts, as will be more fully understood from the following description, when read in conjunction with the accompanying drawing, in which:

FIG. 1 is an elevational view of the attachment slidably mounted on an uncut fish line.

FIG. 2 is an elevational view of the attachment fixedly anchored on the uncut fish line.

FIG. 3 is a sectional view on line 3—3 of FIG. 1.

DETAILED DESCRIPTION OF THE INVENTION

There is shown at 10 the fish line attachment of this invention, consisting of two parts, an elongate body 12, of heavyweight material if for use as a sinker, and of lightweight material if for use as a float. Extending through the longitudinal axis of body 12 is a linear member 14, turned at 16 and 18 in an offset angle to the axis of elongate body 12 and extending a distance about equal to or slightly greater than the radius of the body 12 from its elongate axis and terminating in open end coils 20 and 22. Obviously, instead of being a one piece linear member 14, the offset portions 16 and 18 could be separate portions secured at opposite sides of the body 12 with their terminating coils 20 and 22. While an elongate body is the preferred shape, it could be shaped otherwise, even ball-shaped or cube or parallelopiped-shaped, if desired.

OPERATION OF THE INVENTION

The sinker or float body 12 is preferably elongate as shown, and it is attached to the uncut fish line 24, or is readily detached therefrom, whether the fish line 24 is wet or dry, in either of two simple manners, depending on whether it is desired to attach it slidably, as when used as a sinker, or securely in an anchored position, as when used either as a sinker or as a float.

To attach it slidably, the fish line 24 is merely wound about through each convolution of the coils 20 and 22 to assume the position shown in FIGS. 1 and 3. In such case the body 12 can readily slide along the uncut, unknotted, fish line 24.

If desired to anchor the body in one position on the fish line 24, the fish line 24 is wound about through one coil 20, then wound around about at least one of the offset portions 16 and 18, then wound through the convolutions of the other coil 22, thus anchoring or securing the body 12 against sliding movement on the fish line 24.

To remove the body 12 from either position, the procedure is merely reversed, and it will work as well on a wet fish line 24 as on a dry one. From the slidable position of FIG. 1, the fish line is merely unwound from the convolutions of the coils 20, 22 in the opposite direction, readily removing the body 12 from the fish line 24.

From the anchored position in FIG. 2, the fish line 24 is unwound from at least one coil 20 or 22, and then unwound from about the offset portions 16 and 18, and then from the other coil. If desired, it may be unwound from both coils 20 and 22 before unwinding it from the offset portions 16 and 18 to detach it.

When used as a sinker or a float, depending on the specific gravity of the body 12, it is anchored in the desired position. When used as a sinker, and it is desired to add to the sinker weight, a second sinker is slidably attached to the fishing line at a position convenient to the fisherman, then slid along the fish line 24 until it abuts the sinker anchored thereto. Additional sinkers may be similarly added as desired.

In the drawings, like numbers refer to like parts, and for the purpose of explanation, set forth below are the numbered parts of the improved slip-on fish line attachment:

- 10 fish line attachment
- 12 elongated attachment body
- 14 linear member or wire
- 16 offset portion of 14
- 18 other offset portion of 14
- 20 one coil end of 14
- 22 other coil end of 14
- 24 fish line Although this invention has been described in considerable detail, such description is intended as being illustrative rather than limiting, since the invention may be variously embodied.

Having thus set forth and disclosed the nature of this invention, what is claimed is:

1. A sinker (10) capable of being slidably mounted or fixedly anchored on an uncut fish line (24) comprising a symmetrical sinker body (12) having an axial central opening therethrough, and a line attaching wire (14) extending lengthwise through said axial opening, each end of said wire (14) being offset (16, 18) at approximately right angles thereto a distance at least greater than the maximum transverse radius of said body (12), the ends of said offset portions (16, 18) being coiled into convolutions (20, 22) having aligned axes parallel to the axis of said body (12), whereby when a fish line (24) is wound through said coiled convolutions (20, 22), said coiled convolutions hanging on said fish line (24) may slide freely thereon without frictional contact between said body (12) and the fish line (24), and when the fish line (24) is also wound about either offset portion (16 or 18) before passing through the second coiled convolution (20 or 22) the sinker body (12) is fixedly anchored to the uncut fish line (24).

References Cited

UNITED STATES PATENTS

| | | | |
|---|---|---|---|
| 1,778,119 | 10/1930 | Neville | 43—44.87 |
| 1,883,574 | 10/1932 | Cleeland | 43—43.1 |
| 3,120,715 | 2/1964 | Long | 43—43.1 |

SAMUEL KOREN, Primary Examiner

D. J. LEACH, Assistant Examiner